US010891752B2

(12) United States Patent
Nam (10) Patent No.: US 10,891,752 B2
(45) Date of Patent: Jan. 12, 2021

(54) SENSOR-BASED MOVING OBJECT LOCALIZATION SYSTEM AND METHOD (71) Applicant: Industry Academic Cooperation Foundation Of Yeungnam University, Gyeonsan-si (KR)

(72) Inventor: Seung Yeob Nam, Daegu (KR)

(73) Assignee: INDUSTRY ACADEMIC COOPERATION FOUNDATION OF YEUNGNAM UNIVERSITY, Gyeongsan-Si (KR)

(*) Notice: Subject to any disclaimer, the term of this patent is extended or adjusted under 35 U.S.C. 154(b) by 98 days.

(21) Appl. No.: 16/215,811

(22) Filed: Dec. 11, 2018

(65) Prior Publication Data

US 2020/0027233 A1 Jan. 23, 2020

Related U.S. Application Data

(63) Continuation of application No. PCT/KR2017/012185, filed on Oct. 31, 2017.

(30) Foreign Application Priority Data

Feb. 24, 2017 (KR) .................. 10-2017-0024743

(51) Int. Cl.
*G06K 9/00* (2006.01)
*G06T 7/70* (2017.01)
(Continued)

(52) U.S. Cl.
CPC ............... *G06T 7/70* (2017.01); *G06F 17/16* (2013.01); *G06T 7/194* (2017.01); *G06T 7/20* (2013.01); *H04N 19/51* (2014.11)

(58) Field of Classification Search
CPC .. G06T 7/70; G06T 7/194; G06T 7/20; G06T 7/596; G06T 7/285; G06T 2207/10021; G06T 2207/20068; G06T 3/0031; H04N 19/51; H04N 5/33; G06F 17/16; G05D 1/10

See application file for complete search history.

(56) References Cited

U.S. PATENT DOCUMENTS 6,246,321 B1 * 6/2001 Rechsteiner ..... G08B 13/19602
250/338.1
2001/0004400 A1 * 6/2001 Aoki ................ G08B 13/19602
382/107
(Continued)

FOREIGN PATENT DOCUMENTS

JP    09-97337    * 4/1997 .............. G01S 11/12
JP    H09-97337   * 4/1997 .............. G01C 15/00
(Continued)

OTHER PUBLICATIONS

International Search Report issued in corresponding International Application No. PCT/KR2017/012185 dated Feb. 8, 2018 (3 pages).

*Primary Examiner* — Amara Abdi
(74) *Attorney, Agent, or Firm* — Osha Bergman Watanabe & Burton LLP (57) ABSTRACT

A moving object localization system includes: a sensor that detects a moving object and measures positional information of the moving object; and a server that collects measured information from the sensor and calculates a position of moving object.

11 Claims, 6 Drawing Sheets

(51) Int. Cl.
   *H04N 19/51* (2014.01)
   *G06T 7/194* (2017.01)
   *G06F 17/16* (2006.01)
   *G06T 7/20* (2017.01)

(56) References Cited

U.S. PATENT DOCUMENTS

2013/0278774 A1* 10/2013 Fujimatsu .......... H04N 5/23218
                                                        348/159
2015/0201134 A1*  7/2015 Carr ................... H04N 5/23206
                                                        348/143
2016/0379415 A1* 12/2016 Espeset .................... G06T 7/20
                                                        345/633
2018/0058814 A1*  3/2018 Guthrie ................... F41G 3/165

FOREIGN PATENT DOCUMENTS

| JP | H09-097337 A  | 4/1997  |
| JP | 2001-285849 A | 10/2001 |
| JP | 2009-020779 A | 1/2009  |
| JP | 2014-225762 A | 12/2014 |

* cited by examiner

(Sensor-1)

(Sensor-2)

SENSOR-BASED MOVING OBJECT LOCALIZATION SYSTEM AND METHOD

BACKGROUND

Technical Field

The present invention relates to a system and method of localizing a moving object based on direction information measured through sensors. In detail, the present invention relates to a sensor-based moving object localization system and method that is capable of detecting a moving object by distributed sensors and measuring positional information of the moving object and informing users, thereby preventing privacy exposure problems due to the access of unauthorized moving objects and being used for military purpose.

Description of Related Art

Recently, attempts to utilize drones or unmanned vehicles have been increasingly made, for example, Amazon continues to perform test operations in order to apply drones for goods delivery, and unmanned vehicle technology also has been studied in business or academic world.

In this way, unmanned vehicles can be used for purposes such as delivery of goods, detection of forest fires, and detection of a victim; however, if unmanned vehicles with a camera are freely moved by a general user, privacy infringement such as peeping using an unmanned vehicle may occur. In fact, there were two cases of personal drones crashing into the White House in 2015.

Also, not only personal privacy infringement but also recent cases of developing or using unmanned vehicles for military purposes are reported. When drones are used for military purpose, the size of the drone is smaller than that of conventional airplane and the reflection area of the electromagnetic wave is small, which may result in failure to be detected by a conventional military radar.

Therefore, in consideration of development speeds of personal, commercial, and military drones, it is required to develop drone detection technology as well as drone technology itself.

In addition, it is required to solve the problem of radar shadow which cannot detect an area hidden by a large building or mountain, which is a well-known limitation point in estimating the position of a moving object by the existing radar detection method.

SUMMARY

The present invention aims to provide a sensor-based moving object localization system and method that is capable of detecting a moving object and measuring positional information of the moving object by using a sensor, calculating an angle of the moving object using the measured values, and finally estimating a position of the moving object and transmitting it to a user.

In addition, the present invention aims to provide a sensor-based moving object localization system and method that is capable of resolving radar shadow problem of radar detection method by freely deploying sensors in a desired area to measure positional information of the moving object.

A sensor-based moving object localization system according to one or more embodiments of the present invention may include, in terms of a moving object localization system, a sensor that detects a moving object and measures positional information of the moving object and a server that collects the measured information from the sensor and calculates a position of the moving object.

An intermediate node that receives information transmitted by the sensor and transmits the information to the server may be further included.

The sensor may be an image sensor.

A number of the sensors is more than or equal to two.

A moving object localization method may include, in terms of a moving object localization method, taking pictures at certain intervals by two or more sensors having fixed positions; detecting a moving object by comparing an existing background by each of the sensors and calculating in pixel unit an angle of deviation of moving object from center of the picture when detecting moving object; and aggregating the calculated angle of each sensor in a server and estimating a position of moving object.

The sensor may be an image sensor.

The calculating step is performed in unit of pixels.

A step of transmitting the calculated angle for each sensor to an intermediate node may be further included before the estimation of the position of the moving object.

A sensor-based moving object localization method according to one or more embodiments may include, in terms of a method of localizing a position of a moving object using measurement of angles, projecting a position of a moving object measured by two sensors on horizontal plane in two dimensions and calculating altitude using an elevation angle of the position of the moving object.

If a number of the sensors is plural, a step of selecting two sensors and a step of obtaining an average of ordered pair positions for all ordered pairs of the plurality of sensors may be included.

If the number of sensor nodes is more than or equal to three and there is no point where all target-pointing lines from sensor nodes meet together, a step of estimating coordinate position obtained by projecting the position of the moving object on horizontal plane in two dimensions as a point that minimizes a summation of square of a distance between a selected point and target-pointing lines from each sensor node may be further included.

$$U^* = (X^T X)^{-1} X^T C. \qquad \text{Equation (1)}$$

In equation (1), $U^*$ is a point that minimizes a summation of square of a distance between a selected point and target-pointing lines from each sensor node, $$X = \begin{bmatrix} a_1 & b_1 \\ a_2 & b_2 \\ \vdots & \vdots \\ a_M & b_M \end{bmatrix},$$

target-pointing line is $a_i x + b_i y + c_i = 0$, $a_i = \sin \theta_i$, $b_i = -\cos \theta_i$, $c_i = -\sin \theta_i + \cos \theta_i y_i$, $C = (-c_1, -c_2, \ldots, -c_m)^T$, M is a number of sensors detecting position of moving object, T is a matrix transposition that converts all rows into corresponding columns, C is a vector C that is based on $c_i$ among coefficients $a_i$, $b_i$, and $c_i$ defining a target-pointing line passing each sensor, and X is a matrix X that is based on $a_i$ and $b_i$ among coefficients $a_i$, $b_i$, and $c_i$ defining a target-pointing line.

A step of calculating the position of the moving object as equation (2) below by using a least-square estimation method directly in three-dimensional space rather than projecting the position of the moving object in two dimensions on horizontal plane may be further included.

$$\hat{U} = (I - Y^T Y)^{-1} G. \quad \text{Equation (2)}$$

In equation (2), $\hat{U}$ is a point that minimizes a summation of squares of a distance between a point selected from each sensor and 3D-target-pointing line, and the 3D-target-pointing line is a line that passes sensor and has azimuth angle and elevation angle measured by sensor, $$Y = \begin{bmatrix} \cos(\phi_1)\cos(\theta_1) & \cos(\phi_1)\sin(\theta_1) & \sin(\phi_1) \\ \cos(\phi_2)\cos(\theta_2) & \cos(\phi_2)\sin(\theta_2) & \sin(\phi_2) \\ \vdots & \vdots & \vdots \\ \cos(\phi_M)\cos(\theta_M) & \cos(\phi_M)\sin(\theta_M) & \sin(\phi_M) \end{bmatrix},$$

$$G = \begin{bmatrix} \sum_{i=1}^{M} \{x_i(1 - \cos^2(\phi_i)\cos^2(\theta_i)) - \\ y_i \cos^2(\phi_i)\cos(\theta_i)\sin(\theta_i) - z_i \cos(\phi_i)\sin(\phi_i)\cos(\theta_i)\} \\ \sum_{i=1}^{M} \{-x_i \cos^2(\phi_i)\cos(\theta_i)\sin(\theta_i) + \\ y_i(1 - \cos^2(\phi_i)\sin^2(\theta_i)) - z_i \cos(\phi_i)\sin(\phi_i)\sin(\theta_i)\} \\ \sum_{i=1}^{M} \{-x_i \cos(\phi_i)\sin(\phi_i)\cos(\theta_i) - \\ y_i \cos(\phi_i)\sin(\phi_i)\sin(\theta_i) + z_i(1 - \sin^2(\phi_i))\} \end{bmatrix}.$$

where I is a 3×3 identity matrix, M is a number of sensors that detect U, U is a position of a moving object, $x_i$ is x coordinate of sensor i, $y_i$ is y coordinate of sensor i, $z_i$ is z coordinate of sensor i, $\varphi_i$ is an elevation angle of moving object to direction which sensor i looks towards, $\theta_i$ is an azimuth angle of position of moving object projected on two-dimensional plane to direction which sensor I looks towards, Y is a M×3 matrix defined by coordinate values of each sensor and angular information of moving object measured by sensor, and G is a 3×1 matrix defined by coordinate values of each sensor and angular information of moving object measured by sensor.

According to a sensor-based moving object localization system and method that is the present invention as indicated above, it is possible to detect a moving object using sensors and measure positional information of the moving object, and calculate angle of the moving object using measured values and finally estimate the position of the moving object.

In addition, it is possible to solve the radar shadow problem of radar detection method by freely deploying sensors in a desired area and measuring positional information of a moving object.

DETAILED DESCRIPTION OF EMBODIMENTS

It is noted that the technical terms used in one or more embodiments of the present invention are used only to describe specific embodiments and are not intended to limit the present invention. In addition, the technical terms used in one or more embodiments of the present invention should be construed in a sense generally understood by a person having ordinary skill in the art to which the present invention belongs, unless otherwise defined in one or more embodiments of the present invention, should not be construed to mean, or be interpreted in an excessively reduced sense. In addition, when a technical term used in one or more embodiments of the present invention is an erroneous technical term that does not accurately express the concept of the present invention, it should be understood that it is replaced with a technical term that can be understood by a person skilled in the art. In addition, the general terms used in one or more embodiments of the present invention should be interpreted according to a predefined or prior context, and should not be construed as being excessively reduced.

In addition, the singular expressions used in one or more embodiments of the present invention include plural expressions unless the context clearly dictates otherwise. In the present disclosure, the terms such as "comprising" or "including" and the like should not be construed as necessarily including the various elements described in the disclosure or various steps, and it should be interpreted that some of the elements or some of the steps may not be included, or may include additional elements or steps.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the below, embodiments of the present invention will be described in detail with reference to the accompanying drawings, wherein like reference numerals are used to designate identical or similar elements, and redundant description thereof will be omitted.

In the following description of embodiments of the present invention, detailed description of related arts will be omitted if it is determined that the gist of the present invention may be blurred. It is to be noted that the accompanying drawings are only for the purpose of facilitating understanding of the present invention, and should not be construed as limiting the scope of the present invention with reference to the accompanying drawings.

Figure 1:
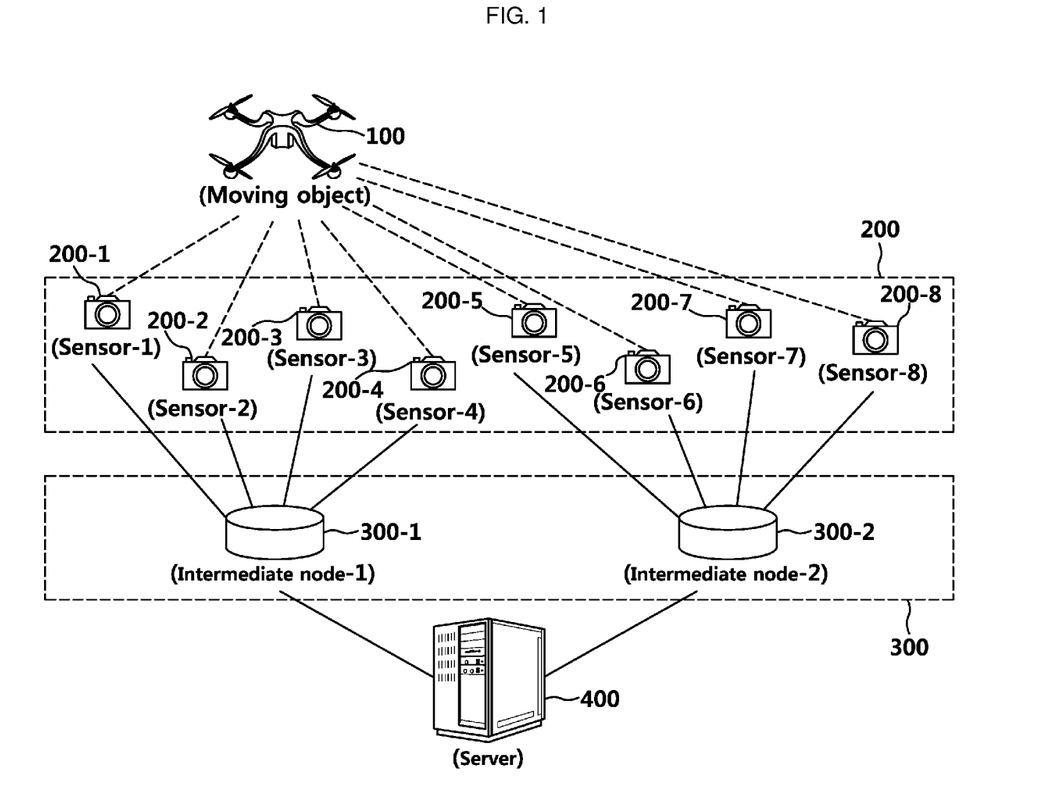
FIG. 1 is a drawing of a sensor-based moving object localization system according to one or more embodiments of the present invention.

FIG. 1 is a drawing showing connection among sensors detecting a moving object and measuring directions, intermediate nodes transmitting information measured by the sensors to a server, and the server estimating position of the moving object based on information measured by the sensors.

In FIG. 1, a moving object localization system according to one or more embodiments of the present invention includes a sensor 200, an intermediate node 300, and a server 400. The sensor 200 may include a plurality of sensors such as a first sensor 200-1, a second sensor 200-2, and so on, and each sensor 200 detects a moving object 100 on its position, measures a direction where the sensor 200 looks at the moving object 100 which is detected based on a direction which sensor 200 looks at, and transmits such measured direction information to a server 400 together with a serial number assigned to itself by going through the intermediate node 300.

The serial number may be a product number assigned when it is produced or may be assigned by a manager, for example, IP address.

As a first step for localization of a moving object, it is a step of detecting a moving object 100 in each sensor 200 and measuring a position of the moving object. In the present disclosure, it is assumed that every sensor 200 shares the same three-dimensional coordinate axes. In order for this, the origin with respect to every sensor 200 should be defined in common.

For example, serial numbers are assigned for each sensor 200 and a position of a sensor having the smallest serial number may be defined as the origin. Each sensor 200 knows its own position in three-dimensional space. The sensor 200 measures direction information at which the sensor looks at a moving object 100 based on the position of itself in three-dimensional space.

Once a moving object 100 is detected and direction information of the moving object 100 is obtained in the sensor 200, then the information measured by the sensor 200 has to be collected in one place as a next step. If the number of sensors 200 is two or more, the position of the moving object 100 can be estimated.

The direction information of the moving object 100 measured in each sensor 200 should be sent to a server 400 together with positional information of the sensor 200 or serial number of the sensor 200. Such information delivery can be implemented by well-known sensor network technology.

At this time, since communication radius is limited depending on communication technology and transmission power and so on which are used for data transmission such that measured information may not be directly transmitted to the server 400, there may occur a case where a node having a function of transmitting information in the middle is needed. These nodes are referred to as an intermediate node 300. That is, the intermediate node 300 is a component that transmits the information measured in the sensor 200 to the server 400.

The sensor 200 and the intermediate node 300 may be wired or wirelessly connected. The number of intermediate nodes 300 needed for the sensor 200 and the server 400 to transmit information may be zero, one, or plural depending on the number of sensors 200, a geographical range in which the sensor 200 is distributed, and the communication radius between the sensor 200 and the server 400.

The intermediate node 300 functions transmitting the measured information received from the sensor 200 toward the server; conversely, when the intermediate node 300 receives information related to setting of each sensor 200 from the server 400, it may transmit information to each sensor 200.

The server 400 collects the information measured by sensor and finally calculates the position of a flight vehicle. For that, components such as a sensor 200 and an intermediate node 300 may be included.

Figure 2:
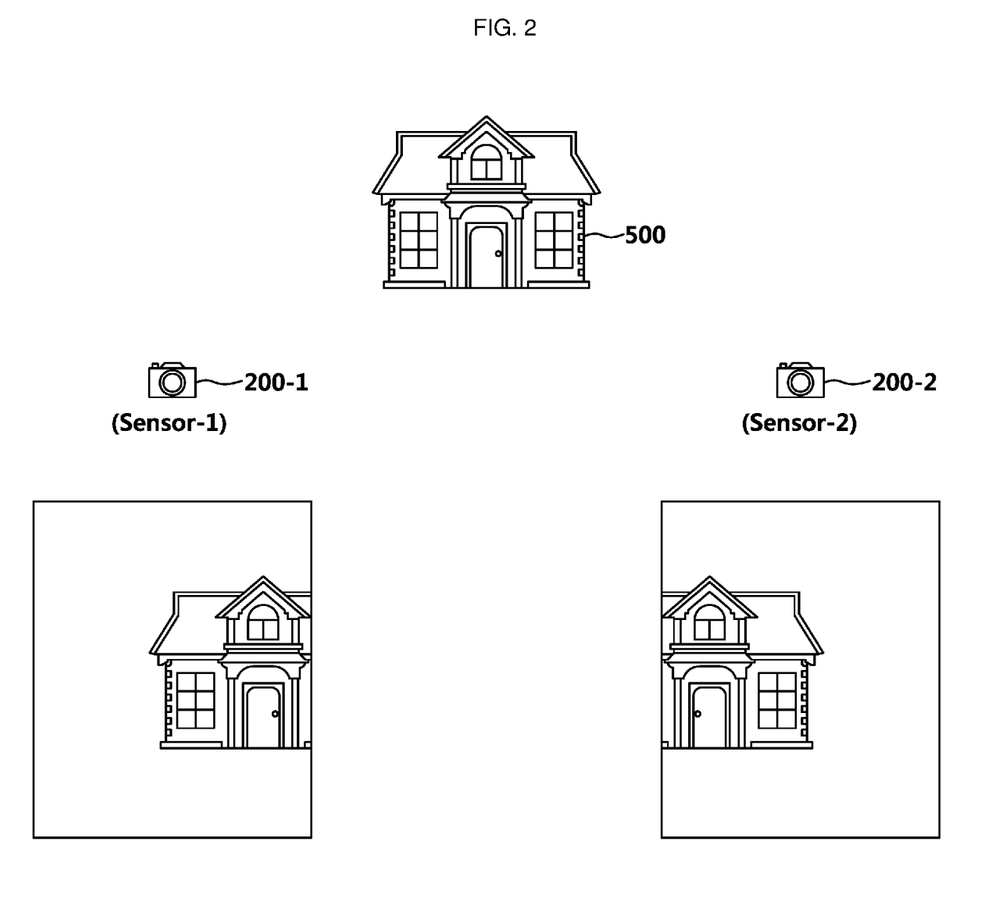
FIGS. 2 and 3 are drawings showing a process in which a sensor according to one or more embodiments of the present invention detects a moving object and measures position of the moving object in units of pixels.
Figure 3:
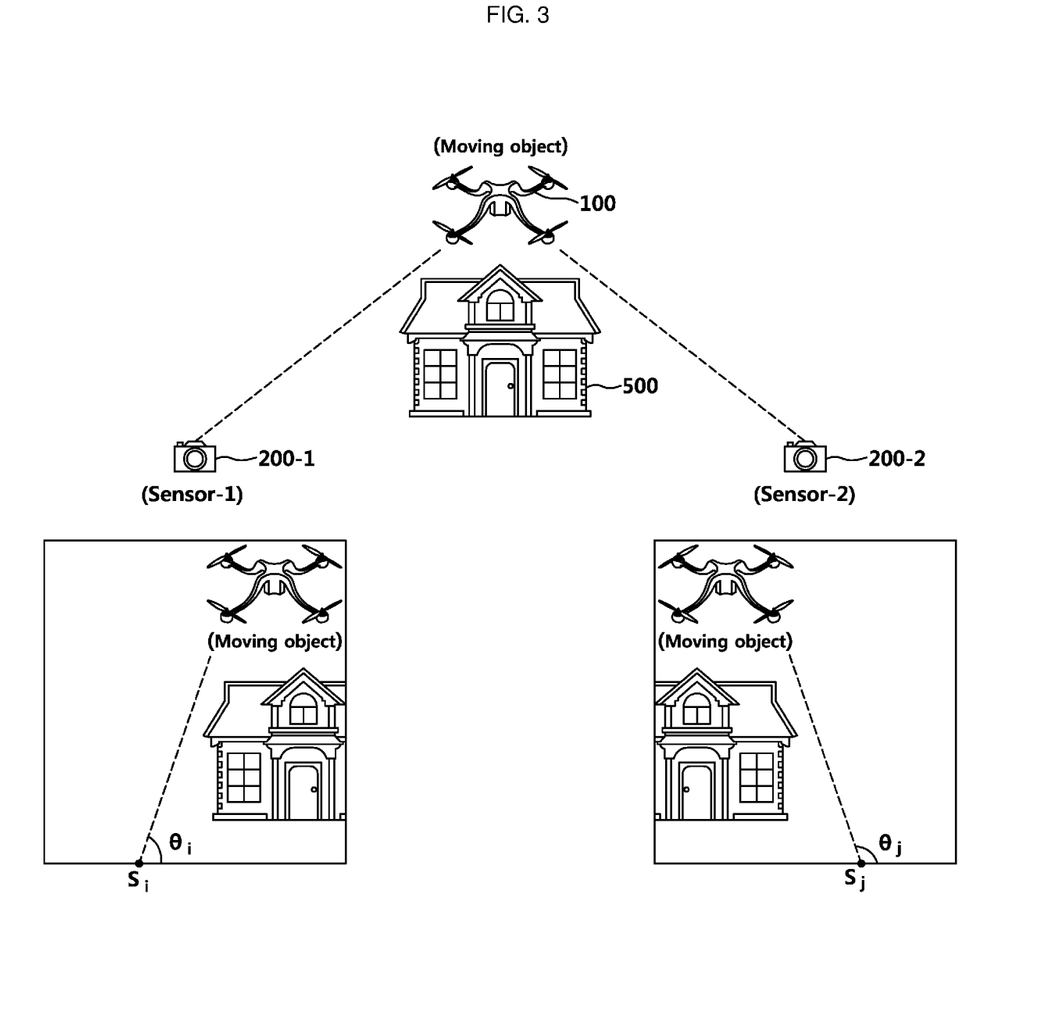

FIGS. 2 and 3 are drawings showing a process that the sensor according to one or more embodiments of the present invention periodically takes pictures to detect a moving object in comparison with an existing background and measures a position of the moving object in units of pixels.

Such direction information may be calculated as follows. If the sensor 200 is an image sensor, such as a camera, the sensor 200 periodically takes pictures and compares them with an existing background to detect of a moving object 100. If the moving object 100 is identified in a picture, a degree of deviation of the moving object 100 from the center of the picture may be calculated in pixel units. The direction of the moving object 100 can be converted into an angle from the pixel by calculating in advance how many degrees correspond to a single pixel.

First, as illustrated in FIG. 2, a sensor-1 (200-1) and a sensor-2 (200-2) take pictures periodically and pixels corresponding to an existing background are stored if a moving object 100 does not appear.

Next, as illustrated in FIG. 3, if a moving object 100 appears, the moving object 100 is detected in comparison with the existing background when the sensor-1 (200-1) and the sensor-2 (200-2) take pictures.

If a moving object 100 is detected in a picture, the degree of the deviation of the moving object 100 from the center of the picture is calculated. The location (U) of the moving object 100 can be measured compounding $\theta_i$ and $\theta_j$ which are respectively angles between $S_i$ and U and an angle between $S_j$ and U, where $S_i$ is a location of the sensor-1 (200-1), $S_j$ is a location of the sensor-2 (200-2), and U is a location of the moving object 100.

The image sensor described in the above embodiments may include: a camera including a thermal imaging camera and an infrared camera; and a thermal image sensor.

Figure 4:
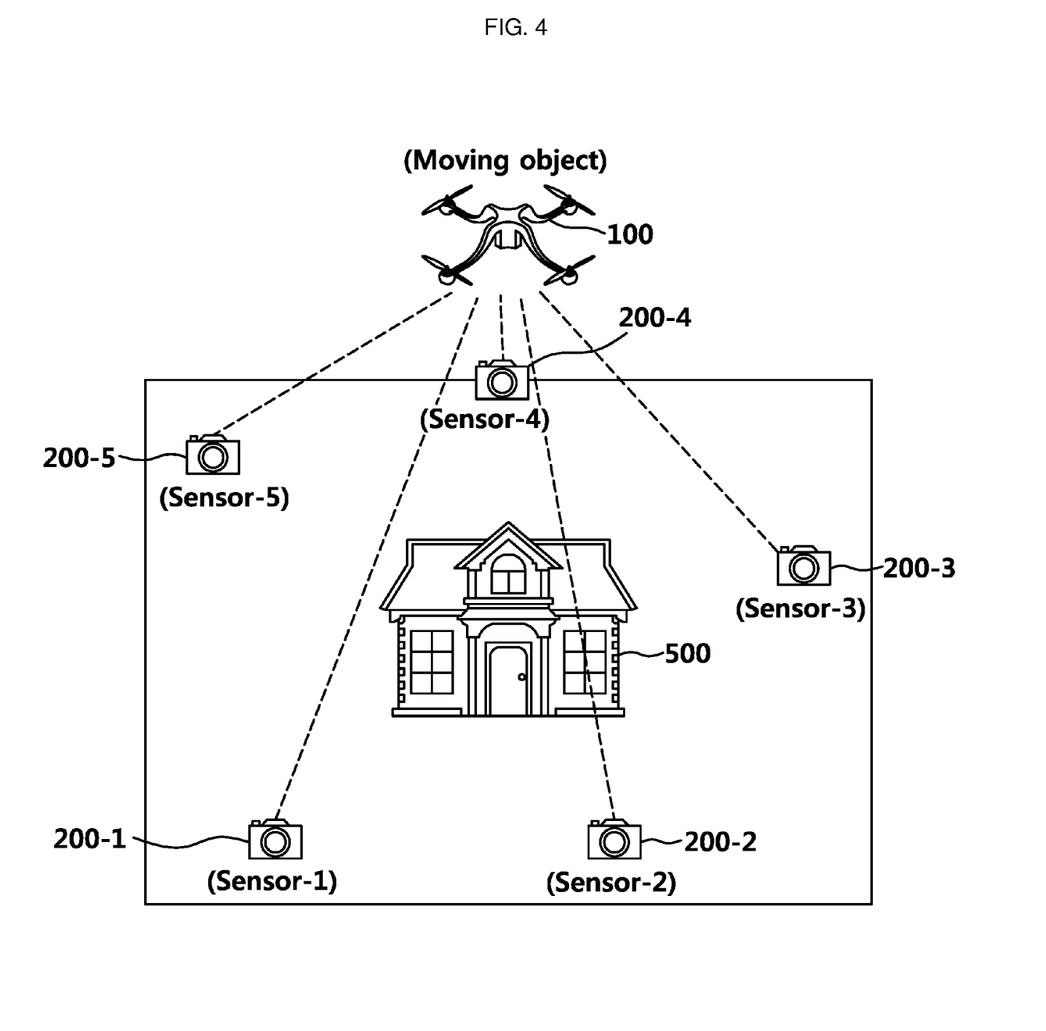
FIG. 4 is a drawing illustrating a process in which a sensor according to one or more embodiments of the present invention detects a moving object and measures positional information of the moving object.

As illustrated in FIG. 4, a sensor-based moving object localization system according to one or more embodiments of the present invention includes a moving object 100 and a sensor 200.

A user installs a sensor 200 in an area where the location of the moving object 100 is desired to be detected, such as near a building 500, when the moving object 100 appears. When the moving object 100 appears, the sensors 200 detect the moving object 100 on their respective locations and measure information of moving object 100 location.

Since a system according to one or more embodiments of the present invention has no problem in localization of the moving object 100 even if a user situate sensors 200 in an area desired, it can solve radar shadow problems that cannot detect areas behind a building or mountain, which is well-known in radar detection methods.

If direction information of moving object measured in a plurality of sensor 200 node is collected, a server 400 considers altogether location information of each sensor 200 node and direction information at which respective sensor 200 looks at a moving object 100 to calculate a location of the moving object 100 on a three-dimensional plane in a way of reducing the location estimation error.

The basic principle of localization is triangulation, and a least-square estimation method can be applied to reduce the error.

Some examples of specific methods that can be used when estimating the location of the moving object 100 by the server 400 will be described below.

Figure 5:
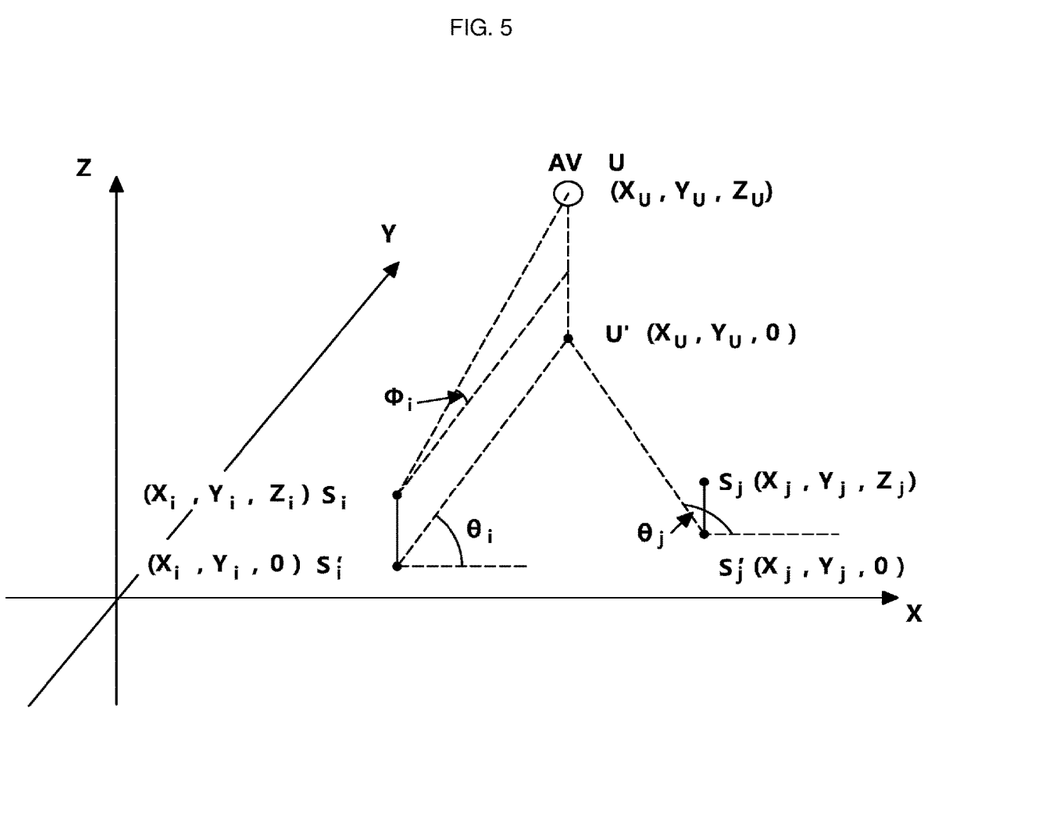
FIG. 5 is a drawing showing a position of a sensor according to one or more embodiments of the present invention, a direction of a moving object measured by the sensor, and variables related thereto.

FIG. 5 is an explanatory view for explaining a location of a sensor according to one or more embodiments of the present invention, a direction of the moving object measured by the sensor, and variables related thereto.

Let the i-th sensor 200 be Si and the coordinates of the location of Si be $(x_i, y_i, z_i)$. A moving object 100 that is a target to be measured is referred to as U, and the position of U is expressed as $(x_u, y_u, z_u)$. For convenience of explanation, it is assumed that all the sensors 200 are likewise oriented in a y-axis direction in a three-dimensional plane. Also, the position of a first sensor is defined as the origin of the three-dimensional shared by all the sensors 200. The points of $S_i$, $S_j$, and U projected in an x-y plane are referred to as $S_i'$, $S_j'$, and U', respectively.

Assuming that an angle of $S_i'$ to U' in the x-y plane is $\theta_i$ and an angle between a line connecting $S_i$ and U with respect to x-y plane is $\varphi_i$, the direction in which a sensor $S_i$ looks at the moving object U 100 is represented as ($\theta_i$, $\varphi_i$) in a spherical coordinate system. The direction of the moving object can be calculated based on a sensor that measured through the coordinates.

A first exemplary method for localization of the moving object 100 using the direction information measured by the sensor is described below.

If there is no error in the direction information measured by the sensor 200, the position of the moving object 100 can be estimated by the well-known triangulation method. As illustrated in FIG. 5, a straight line emanates from $S_i'$ toward an angle $\theta_i$ in the x-y plane and a straight line emanates from $S_j'$ toward an angle $\theta_j$, then two straight lines meet at U'. Because the x and y coordinates of U and U' are the same by definition of projection, the x and y coordinates of the moving object 100 are obtained by the intersection of two straight lines. In FIG. 3, based on the position of $S_i$ and the position of U, $\varphi_i$ satisfies the following relation.

$$\tan(\phi_i) = \frac{z_U - z_i}{\sqrt{(x_i - x_U)^2 + (y_i - y_U)^2}}.$$

By solving the above equation in terms of $z_u$, the following equation is obtained.

$$z_U = z_i + \tan(\phi_i)\sqrt{(x_i - x_U)^2 + (y_i - y_U)^2}. \quad (1)$$

Thus, z coordinate of the moving object 100 is determined by equation (1).

If there is no error in an angle of the moving object measured by the sensor 200, the position of the moving object 100 can be determined by the triangulation described so far. However, if there is an error in a sensor value, an error may also occur in an estimated position of the moving object 100. The angle measurement of each sensor 200 node may not be accurate in real world due to limited resolution of an image, distortion of the image by an unclean incorrect lens, and so on. Thus, localization of the moving object 100 has to be detailed under conditions such as distorted measurement due to noise.

When sensors 200 are plural in number, the following method may be considered as a method of reduction in error. Assuming that the number of sensors 200 is N, a method of extracting two sensors 200 from N sensors 200 is (N−1)/2. A method of estimating a position of the moving object 100 by applying triangulation to each of the selected sensors 200 and estimating the estimated position of the moving object 100 as a position of the moving object 100 by obtaining an average for all ordered pairs is referred to as first estimation method or centroid method.

A localization of the moving object 100 according to one or more embodiments of the present invention is as follows. When the number of sensor 200 nodes is more than or equal to three and the azimuth measurement is not accurate due to noise, there may not be a single point where all the target-pointing lines from the sensor 200 node meet together. The straight line from the sensor $S_i'$ to an angle $\theta_i$ in the x-y plane is referred to as target-pointing line (TPL) $l_i$. The TPL $l_i$ can be expressed by the following equation.

$$a_i x + b_i y + c_i = 0,$$

where $a_i$, $b_i$, and $c_i$ may be expressed as follows:

$$a_i = \sin\theta_i, \ b_i = -\cos\theta_i, \ c_i = -\sin\theta_i x_i + \cos\theta_i y_i.$$

If there is no error in a direction measurement value of sensor $S_i'$, $l_i$ will pass through U', and if there is an error in a direction measurement value of sensor $S_i'$, it will not pass through U'. The distance between any point $\beta = (t_1, t_2)^T$ on the x-y plane and the target-pointing line $l_i$ can be expressed as follows:

$$d((t_1, t_2), l_i) = \frac{|a_i t_1 + b_i t_2 + c_i|}{\sqrt{a_i^2 + b_i^2}}$$
$$= |a_i t_1 + b_i t_2 + c_i|,$$

Here, second equal sign is established because $a_i^2 + b_i^2 = \sin^2\theta_i + \cos^2\theta_i = 1$. S(U) is referred to as a set of sensors 200 that defects a target moving object U 100. It is assumed that the number of sensors belonging to S(U) is M and that the sensors 200 belonging to S(U) are numbered from 1 to M again. Then, a second position estimating method of a moving object 100 estimates the position U* at which the sum of the squares of the distances to all target-pointing lines is minimized as the position of the moving object 100 as shown in the following equation.

$$U^* = \arg\min_{\beta=(t_1,t_2)^T} \sum_{i \in S(U)} d((t_1, t_2), l_i)^2$$
$$= \arg\min_{\beta=(t_1,t_2)^T} \sum_{i=1}^{M} |a_i t_1 + b_i t_2 + c_i|^2.$$

This problem is a least square optimization problem, and if a vector C that is based on ci among coefficients $a_i$, $b_i$, and $c_i$ defining a target-pointing line passing each sensor and a matrix X that is based on $a_i$ and $b_i$ among the coefficients $a_i$, $b_i$, and $c_i$ defining a target-pointing line are defined as follows:

$$C = (-c_1, -c_2, \ldots, -c_M)^T,$$

$$X = \begin{bmatrix} a_1 & b_1 \\ a_2 & b_2 \\ \vdots & \vdots \\ a_M & b_M \end{bmatrix},$$

Then the optimal solution for this problem U* can be obtained as follows:

$$U^* = (X^T X)^{-1} X^T C. \quad (2)$$

In the equation (2), T is a matrix transposition that converts all rows into corresponding columns. Since U* is an estimate for U', x and y coordinates of the moving object 100 are estimated by equation (2). After the x and y coordinates of the moving object 100 are obtained, z coordinate of the moving object 100 can be obtained by the equation (1) as in the first method. The second position estimating method of the moving object 100 described above is referred to as 2D-TPL method.

An example of the position estimating method of the moving object 100 according to one or more embodiments of the present invention is similar to the second position estimating method of the moving object, but there is a difference in that the optimization problem is handled in a three-dimensional space rather than in a two-dimensional space.

A method of estimating a position of the moving object 100 by finding a point in a three-dimensional space that minimizes summation of the squares of the distance to target-pointing lines (TPLs) passing each sensor 200 node in three-dimensional space and estimating the point as the position of the moving object 100 is an example of a third method of estimating position of a moving object 100. This scheme is referred to as 3D-TPL. The straight line passing a sensor i at an angle at which the sensor i measures the moving object is indicated by the 3D-TPL Li. An arbitrary point $\vec{v}$ on the 3D-TPL Li can be expressed as:

$$\vec{v} = \begin{bmatrix} x_i + \cos(\phi_i)\cos(\theta_i)t \\ y_i + \cos(\phi_i)\sin(\theta_i)t \\ z_i + \sin(\phi_i)t \end{bmatrix},$$

where, t is a real number corresponding to each point. The distance $d((t_1,t_2,t_3), L_i)$ between a point $\gamma=(t_1,t_2,t_3)$ and the 3D-TPL Li can be expressed as:

$$d((t_1,t_2,t_3),L_i) = (t_1-x_i)^2 + (t_2-y_i)^2 + (t_3-z_i)^2 - ((x_i-t_1)\cos(\phi_i)\cos(\theta_i) + (y_i-t_2)\cos(\phi_i)\sin(\theta_i) + (z_i-t_3)\sin(\phi_i))^2. \quad (3)$$

Since Li is determined from the measurement of $S_i$, $f_i(t_1,t_2,t_3) = d((t_1,t_2,t_3), L_i)$ is defined. The position of the target moving object 100 U is defined by $\hat{U}$ as follows:

$$\hat{U} = \underset{\gamma=(t_1,t_2,t_3)^T}{\arg\min} F(t_1, t_2, t_3), \quad (4)$$

where $F(t_1, t_2, t_3) = \sum_{1 \leq i \leq M} f_i(t_1, t_2, t_3)$, and M is the number of sensors 200 that detected U. In other words, U is estimated as the point $\hat{U}$ that minimizes summation of the squares of the distance to 3D-TPL defined by sensors 200 detecting U in three-dimensional space.

Because the Hessian matrix of $f_i(t_1,t_2,t_3)$ is positive semi-definite, $f_i(t_1,t_2,t_3)$ defined by equation (3) is convex. Since $f_i$ is convex, the summation of fi, that is, F of equation (4), becomes convex again.

Since F is quadratic and convex, F has a global minimum at a point $\gamma=(t_1,t_2,t_3)^T$, where the following equations are simultaneously satisfied:

$$\frac{\partial F}{\partial t_1} = 0, \frac{\partial F}{\partial t_2} = 0, \frac{\partial F}{\partial t_3} = 0.$$

The above set of simultaneous equations can be summarized as $$(I - Y^T Y)\gamma = G, \quad (5)$$

where I is a 3×3 identity matrix, and Y and G are M×3 and 3×1 matrices, respectively, defined by coordinate values of each sensor and the angular information of the moving object measured by the sensor. Here, M is the number of sensors detecting the moving object U.

$$Y = \begin{bmatrix} \cos(\phi_1)\cos(\theta_1) & \cos(\phi_1)\sin(\theta_1) & \sin(\phi_1) \\ \cos(\phi_2)\cos(\theta_2) & \cos(\phi_2)\sin(\theta_2) & \sin(\phi_2) \\ \vdots & \vdots & \vdots \\ \cos(\phi_M)\cos(\theta_M) & \cos(\phi_M)\sin(\theta_M) & \sin(\phi_M) \end{bmatrix},$$

$$G = \begin{bmatrix} \sum_{i=1}^{M} \{x_i(1 - \cos^2(\phi_i)\cos^2(\theta_i)) - y_i \cos^2(\phi_i)\cos(\theta_i)\sin(\theta_i) - z_i \cos(\phi_i)\sin(\phi_i)\cos(\theta_i)\} \\ \sum_{i=1}^{M} \{-x_i \cos^2(\phi_i)\cos(\theta_i)\sin(\theta_i) + y_i(1 - \cos^2(\phi_i)\sin^2(\theta_i)) - z_i\cos(\phi_i)\sin(\phi_i)\sin(\theta_i)\} \\ \sum_{i=1}^{M} \{-x_i \cos(\phi_i)\sin(\phi_i)\cos(\theta_i) - y_i\cos(\phi_i)\sin(\phi_i)\sin(\theta_i) + z_i(1 - \sin^2(\phi_i))\} \end{bmatrix}.$$

Since the solution of equation (5) can be obtained by multiplying $(I - Y^T Y)^{-1}$ on both sides of equation (5), combining equations (4) and (5) yields $$\hat{U} = (I - Y^T Y)^{-1} G.$$

The position estimating method of the moving object 100 described above assumes that each sensor 200 observes only one moving object 100 at most; however, if each sensor 200 can distinguish a plurality of moving objects 100 even when each sensor 200 observes a plurality of moving objects and if each sensor 200 can extract and exchange characteristic information for each moving object 100 that can distinguish whether or not a moving object 100 observed among the different sensors 200 is the identical moving object 100 (when each sensor 200 sends additional characteristic information for each moving object 100 to a server 400, whether or not the moving objects 100 observed by the different sensor 200 are identical can be determined by the server 400), the above-described method of estimating position of the moving object 100 can be applied equally to each moving object 100.

Figure 6:
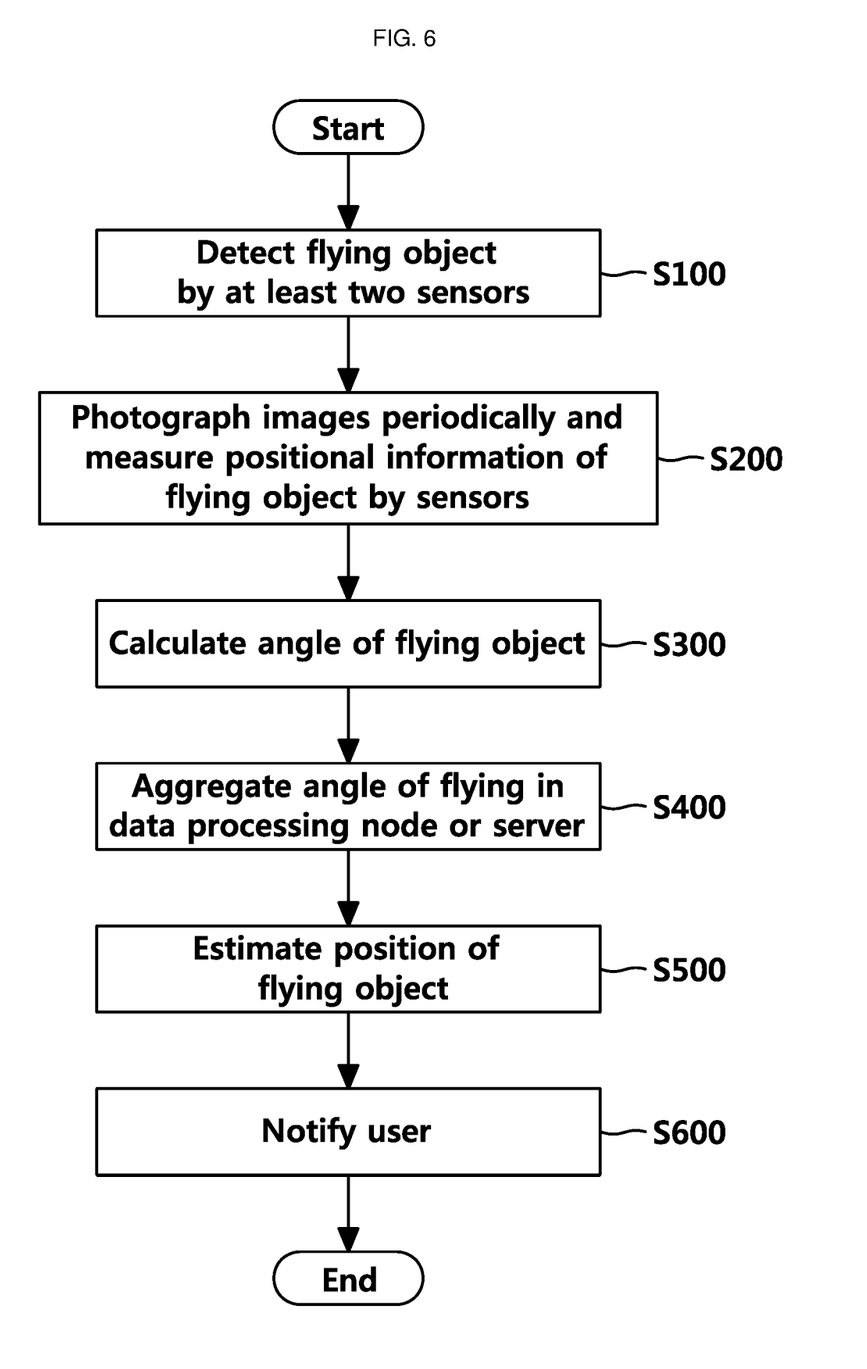
FIG. 6 is a drawing of a flowchart illustrating a sensor-based method of localizing a moving object according to one or more embodiments of the present invention.

FIG. 6 is a flowchart illustrating a sensor-based method of estimating location of a moving object according to one or more embodiments of the present invention.

Two or more sensors 200 are installed in a place where a moving object 100 is desired to be detected. The sensor 200 may be an image sensor. It is possible to detect the moving object 100 by periodically taking a picture and comparing it with an existing background.

When the moving object 100 appears, the sensor 200 detects the moving object 100 (S100).

The sensor 200 that detects the moving object 100 measures information related to the position of the moving object 100 by capturing the image on a predetermined time basis (S200). The degree to which the moving object 100 deviates from the center of a picture can be calculated in pixel units.

The directional angle of the moving object 100 is calculated by converting the measured pixel unit value through the measured positional information of the moving object 100 (S300). It is possible to convert the number of pixels to an angle by precalculating how many pixels correspond to one horizontal direction pixel and one vertical direction pixel.

The calculated angle of the moving object 100 is integrated at a data processing node or a server 400 (S400).

The position of the moving object 100 is estimated through the positional information of the moving object 100 integrated in the server 400 (S500). The estimated position of the moving object 100 is notified to a system user (S600).

The features, structures, effects and the like described in the above embodiments are included in at least one or more embodiments of the present invention, and are not necessarily limited to only one or more embodiments. Further, the features, structures, effects and the like illustrated in the embodiments can be combined and modified by other persons skilled in the art to which the embodiments belong.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A moving object localization system comprising:
a plurality of sensors including an ordered pair of sensors that detect a moving object and measure positional information of the moving object; and
a server that:
collects the measured positional information from the ordered pair of sensors,
calculates a position of the moving object,
selects other ordered pairs among the plurality of sensors, and
obtains an average of ordered pair positions for all ordered pairs of the plurality of sensors.

2. The system of claim 1, wherein the ordered pair of sensors are image sensors.

3. The system of claim 2, wherein the image sensors are either:
cameras comprising a thermal imaging camera and an infrared camera; or
thermal imaging sensors.

4. A moving object localization method, comprising:
taking pictures at certain intervals by an ordered pair of sensors among a plurality of sensors having fixed positions;
detecting, by each of the ordered pair of sensors, a moving object by comparing each of the pictures with an existing background and calculating an angle of deviation of the moving object from a center of each of the pictures taken when detecting the moving object;
aggregating the calculated angle of each of the ordered pair of sensors in a server and estimating a position of the moving object;
selecting other ordered pairs among the plurality of sensors; and
obtaining an average of ordered pair positions for all ordered pairs of the plurality of sensors.

5. The method of claim 4, wherein the ordered pair of sensors are image sensors.

6. The method of claim 4, wherein the calculating is executed in unit of pixels.

7. A method of estimating a position of a moving object by triangulation, comprising:
projecting the position of the moving object measured by an ordered pair of sensors among a plurality of sensors on a horizontal plane in two dimensions;
calculating an altitude using an elevation angle of the position of the moving object;
selecting other ordered pairs among the plurality of sensors; and
obtaining an average of ordered pair positions for all ordered pairs of the plurality of sensors.

8. The method of claim 7, further comprising:
if a number of sensor nodes is more than or equal to three and there is no point where all target-pointing lines from sensor nodes meet together,
estimating a coordinate position obtained by projecting the position of the moving object on the horizontal plane in two dimensions as a point that minimizes a summation
of square of a distance between a selected point and each of the target-pointing lines from each of the sensor nodes, and
being characterized by satisfying equation (1) below:

$$U^* = (X^T X)^{-1} X^T C. \qquad (1)$$

wherein $U^*$ is a point that minimizes a summation of square of a distance between a selected point and each of the target-pointing lines from each of the sensor nodes, $$X = \begin{bmatrix} a_1 & b_1 \\ a_2 & b_2 \\ \vdots & \vdots \\ a_M & b_M \end{bmatrix},$$

target-pointing line is $a_i x + b_i y + c_i = 0$, $a_i = \sin \theta_i$, $b_i = -\cos \theta_i$, $c_i = -\sin \theta_i x_i + \cos \theta_i y_i$, $C = (-c_1, -c_2, \ldots, -c_m)T$,
M is a number of sensors detecting the position of the moving object,
T is a matrix transposition that converts all rows into corresponding columns,
C is a vector C that is based on $c_i$ among coefficients $a_i$, $b_i$, and $c_i$ defining each of the target-pointing lines passing each of the sensors, and
X is a matrix X that is based on $a_i$ and $b_i$ among coefficients $a_i$, $b_i$, and $c_i$ defining each of the target-pointing lines,
X is a matrix X that is based on $a_i$ and $b_i$ among coefficients $a_i$, $b_i$, and $c_i$ defining each of the target-pointing lines.

9. The method of claim 7, further comprising calculating the position of the moving object as equation (2) below by using a least-square estimation method directly in three-dimensional space rather than projecting the position of the moving object in two dimensions on horizontal plane:

$$\hat{U} = (I - Y^T Y)^{-1} G.$$

wherein $\hat{U}$ is a point that minimizes a summation of squares of a distance between a point selected from each of the plurality of sensors and 3D-target-pointing line, the 3D-target-pointing line is a line that passes each of the plurality of sensors and has azimuth angle and elevation angle measured by each of the plurality of sensors, $$Y = \begin{bmatrix} \cos(\phi_1)\cos(\theta_1) & \cos(\phi_1)\sin(\theta_1) & \sin(\phi_1) \\ \cos(\phi_2)\cos(\theta_2) & \cos(\phi_2)\sin(\theta_2) & \sin(\phi_2) \\ \vdots & \vdots & \vdots \\ \cos(\phi_M)\cos(\theta_M) & \cos(\phi_M)\sin(\theta_M) & \sin(\phi_M) \end{bmatrix},$$

-continued $$G = \begin{bmatrix} \sum_{i=1}^{M} \{x_i(1-\cos^2(\phi_i)\cos^2(\theta_i)) - \\ y_i \cos^2(\phi_i)\cos(\theta_i)\sin(\theta_i) - z_i \cos(\phi_i)\sin(\phi_i)\cos(\theta_i)\} \\ \sum_{i=1}^{M} \{-x_i \cos^2(\phi_i)\cos(\theta_i)\sin(\theta_i) + \\ y_i(1-\cos^2(\phi_i)\sin^2(\theta_i)) - z_i \cos(\phi_i)\sin(\phi_i)\sin(\theta_i)\} \\ \sum_{i=1}^{M} \{-x_i \cos(\phi_i)\sin(\phi_i)\cos(\theta_i) - \\ y_i \cos(\phi_i)\sin(\phi_i)\sin(\theta_i) + z_i(1-\sin^2(\phi_i))\} \end{bmatrix}.$$

wherein I is a 3×3 identity matrix, M is a number of sensors that detect U, U is the position of the moving object, $x_i$ is x coordinate of sensor i, $y_i$ is y coordinate of sensor i, $z_i$ is z coordinate of sensor i, $\varphi_i$ is an elevation angle of the moving object to a direction which sensor i looks towards, $\theta_i$ is an azimuth angle of the position of the moving object projected on the two-dimensional plane to a direction which sensor I looks towards, Y is a M×3 matrix defined by coordinate values of each of the sensors and angular information of the moving object measured by each of the sensors, and G is a 3×1 matrix defined by coordinate values of each of the sensors and angular information of the moving object measured by each of the sensors.

10. The system of claim 1, further comprising an intermediate node that receives and transmits information transmitted by the ordered pair of sensors to the server.

11. The method of claim 4, further comprising transmitting the calculated angle of each of the ordered pair of sensors to an intermediate node, before estimating the position of the moving object.

* * * * *